United States Patent [19]
Wechsler

[11] Patent Number: 5,636,592
[45] Date of Patent: Jun. 10, 1997

[54] PORTABLE DEVICE FOR FEEDING ANIMALS

[76] Inventor: Lawrence I. Wechsler, One Wooleys La., Great Neck, N.Y. 11023

[21] Appl. No.: 484,679

[22] Filed: Jun. 7, 1995

[51] Int. Cl.⁶ .................................................. A01K 5/01
[52] U.S. Cl. ...................... 119/52.1; 119/77; 119/53
[58] Field of Search .................... 119/51.12, 51.5, 119/53, 53.5, 54, 56.1, 77, 72, 74, 52.1

[56] References Cited

U.S. PATENT DOCUMENTS

| | | | |
|---|---|---|---|
| 1,431,472 | 10/1922 | Liggett | 119/53 |
| 2,874,678 | 2/1959 | Bradley | 119/77 |
| 4,450,790 | 5/1984 | Stansbury, Jr. | 119/51.12 |
| 5,467,735 | 11/1995 | Chrisco | 119/51.5 |

*Primary Examiner*—Robert P. Swiatek
*Assistant Examiner*—Yvonne Abbott

[57] ABSTRACT

A portable device permits the dispensing of water, potable liquids, particulate solids and other like flowable feed material to dogs and other animals from a reservoir mountably receivable thereon, into a pooling space for consumption. A trough having a shape which allows nesting of the reservoir therein is movably coupled with the reservoir to allow movement from a first mounted position in which the bottle and trough are nested, to a second mounted position in which the reservoir brought out of nesting position and is clear of the trough. In the second mounting position, the concave interior of the trough provides the pooling space, and an outlet of the reservoir is in pool feeding communication therewith, to permit at least partial emptying of the contents of the reservoir into the trough, when a contents emptying force is applied.

20 Claims, 9 Drawing Sheets

PORTABLE DEVICE FOR FEEDING ANIMALS

BACKGROUND OF THE INVENTION

The present invention relates to a portable device for selectively dispensing feed material to animals, and more particularly to a device which is useful for dispensing water, potable liquids, granulated solids and other flowable consumables from a reservoir into a pooling region for consumption thereof.

It is known that dogs and certain other household pets will drink only their fill of liquids. It is therefore, acceptable, as well as desirable, that they be given access to a supply of water at all times. Generally this consists of periodic filling of a bowl with water in order to maintain the constant supply.

In a desire to better meet the need for providing a replenishable supply of liquids, a device is described in the prior art which utilizes a bowl, adapted to receive and hold an inverted bottle-shaped reservoir containing water. The bowl includes means for maintaining the reservoir in a generally vertical, inverted position, with the neck opening positioned below the lip of the bowl. Due to such configuration, the water pours from the reservoir, and fills the bowl, but does not overflow it, because atmospheric pressure exerts a downward force on the surface of the water in the bowl. As a dog or other animal drinks from the bowl, water from the reservoir replaces the consumed amount, maintaining water in the bowl at a constant level just above where the neck opening penetrates the surface.

This approach is effective in supplying a replenishable source of water where a level grade location is available. However, the device is not intended for portable use, for example where a dog is taken to a park, fair, outdoor antique show or the like. In such situations, the pet owner will take along a bowl and either bring a sealed bottle of water, or seek a water supply as needed.

OBJECTS AND SUMMARY OF THE INVENTION

Accordingly, it is an object of the invention to provide a feed dispenser for animals, for dispensing water, potable liquids, granulated solids and other flowable consumables for consumption thereof, which overcomes the drawbacks of the prior art.

It is a further object of the invention to provide a dispenser capable of administering liquids, which is portable, and which will supply a dog or other animal with liquids on a continuous basis without leakage when not in use.

It is a still further object of the invention to provide the liquid dispenser in a form which is compact, easy to operate and which may be produced economically.

Briefly stated, there is provided a portable device for dispensing water, potable liquids, particulate solids and other like flowable feed material to dogs and other animals. The portable dispenser, when connected to a reservoir which is mountably receivable thereon, permits contents contained therein to be selectively dispensed. The reservoir may conveniently be a commonly available plastic bottle containing spring water or like beverage, having, for example, a cylindrical elongate shape and narrow threaded mouth opening. A trough having a shape which allows nesting of the reservoir therein is movably coupled with the reservoir to allow reservoir movement from a first mounted position thereof in which the bottle and trough are nested, to a second mounted position in which the reservoir is un-nested clear of the trough. With the reservoir in the second mounted position, the interior of the trough provides a pooling space, and an outlet of the reservoir is in pool feeding communication therewith, to permit at least partial emptying of the contents of the reservoir into the trough, when a contents emptying force is applied.

In one dispenser embodiment, means are provided, preferably in the form of a valve coupled to the outlet of the reservoir, for selectively permitting and restricting flow from the reservoir outlet into the trough.

In a particularly advantageous embodiment of the invention, a bottle-shaped reservoir is hingably connected to the trough at a location thereon which allows the bottle and trough to be connectively hinged apart from their nesting position, to one in which the trough is relatively horizontal, and the reservoir in a position to permit at least partial emptying of the liquid contents of the reservoir into the trough. Conveniently, although not necessarily, this will be a position in which the reservoir is at least partially inverted, with the outlet opening thereof in a lowermost position. In this manner, gravity acting upon the contents in the inverted reservoir provides the contents emptying force necessary to expel the contents. The valve is selectively opened to allow a measured amount of feed material, for example water, to fill the trough, from which the animal is then free to drink. When the animal has taken its fill, the trough can be hinged back into the nesting position about the sides of the reservoir, orienting the dispenser for convenient handling and/or storage until next needed.

In an embodiment of the present invention, a manually operated valve caps the opening of an elongate, bottle-shaped reservoir. The valve provides a nozzle-like aperture through which the liquid contained within the bottle can be expelled. Pivot means disposed proximate the valve and an end of the trough, permits valve/bottle relative rotation about an axis perpendicular with a longitudinal axis of the trough. By rotation about this axis, the bottle may be hinged from a position in which its longitudinal axis is in substantial alignment with the longitudinal axis of the trough, to one in which the longitudinal axes of each are approximately perpendicular with one another. Once rotated, the trough is oriented in a relatively horizontal position, and the bottle generally vertical. In this position, the nozzle-like opening locates below an upper rim of the trough. The valve is opened and the liquid contained within the bottle allowed to flow into the trough under the influence of gravity, until the surface of the liquid in the trough rises above the opening in the nozzle. The atmospheric pressure on the surface of the water maintains the level at the height of the opening. The animal may then drink its fill, while the bottle continues to supply liquid to the trough as needed to maintain the level at the height determined by the level of the opening in the nozzle above the bottom of the trough. When the animal is finished drinking, the valve is closed and any left over liquid in the trough discarded. The trough or bottle can then be pivoted to close the dispenser with the bottle at least partially nested in the trough.

In another embodiment, a valve is provided which is automatically activated by the action of pivoting the bottle relative to the trough. In an embodiment providing an example of such automatic means responsive to the mounted movement, a stop-cock type valve provides both the means for movably mounting the reservoir to the trough to allow hinging of the trough with respect to the reservoir, as well as the means for controlling flow of liquid from the reservoir outlet into the trough. The outlet of the reservoir is sealingly coupled to a stop-cock type valve comprising a cylindrical valve member rotatable within a valve body, the stop-cock valve oriented with its cylindrical axis perpendicular to the longitudinal axis of the reservoir. The valve body includes a bore formed crosswise the cylindrical valve seat for receiving the cylindrical valve member, the bore communicating with the interior of the reservoir and a valve outlet. The rotatable cylindrical valve member includes a bore formed crosswise its cylindrical axis, which may be brought into communicative alignment with the valve body bore, by a respective rotational positioning thereof. The cylindrical valve member is fixedly held by opposed peripheral walls of the trough to prevent rotation thereof with respect to the trough. The bores of both the cylindrical valve member and the valve body are oriented such that the bores are aligned when the orientation of the longitudinal axis of the trough with respect to that of the bottle are substantially perpendicular with one another, thereby permitting flow through the valve. Consequently, the valve is closed when the bottle is nested within the trough, and opened when the bottle is rotated about the cylindrical valve member within the outer valve seat to a position in which the longitudinal axis of the bottle is perpendicular to that of the trough.

In another embodiment, the portable device for dispensing flowable feed material to dogs and other animals, is provided further with means for stabilizing the device when placed on a support surface. In the preferred case, support members are hingably connected to the dispenser, permitting them to be folded against the dispenser to minimize its overall volume when not being used, and pivoted into an unfolded position in which, by extending outwardly from the dispenser and contacting the support surface, the support members provide stability against the dispenser being tipped over.

In a further embodiment, a dispenser is provided in which the reservoir pivots laterally out of nesting relationship with the trough. Instead of including a second mounted position in which the reservoir is oriented vertically, perpendicular with that of the trough, rather, the reservoir is laterally pivoted on its side to a position alongside the trough, where it remains horizontally positioned, parallel with the trough. Since the outlet of the reservoir is not positioned above the pooling space formed by the interior shape of the trough, as in the previous embodiment, the reservoir is in pool feeding communication with the pooling space through the use of a tube connecting the outlet and the interior of the trough, which thereby provides means for directing an induced flow of the contents from the reservoir into the pooling space when in the second mounted position. Additionally, since the reservoir is oriented horizontally when in the second mounted position with the outlet thereof disposed in a side position, rather than in a lowermost position as in the prior embodiments, it may be necessary to induce flow therefrom by means other than solely relying on gravity feed, for example by squeezing the reservoir to provide a sufficient contents emptying force.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7a is a longitudinal cross-sectional detail of the nozzle coupling assembly showing relative alignment of the bores as oriented in FIG. 4a.

FIG. 7b is a longitudinal cross-sectional detail of the nozzle coupling assembly showing relative alignment of the bores as oriented in FIG. 4b.

FIG. 10b is a top plan view of the dispenser of FIG. 10a.

DETAILED DESCRIPTION OF THE PREFERRED EMBODIMENT

The invention provides that a trough/reservoir combination can be embodied in a conveniently carded and utilized envelope of structure taken by a user for ultimate end use of animal feeding wherever the user and his animal go. In broad terms, a reservoir is movably mounted to a trough so that the reservoir can nest in the trough in non-use condition. When needed for feeding, the reservoir can be moved clear of the trough so that contents of the reservoir can be transferred to the trough to pool same as a feed source for the animal who will have ready access to the pooled feed.

Referring now to the drawings, and particularly FIGS. 1a, 1b, 2a and 2b, there is shown, generally at 10, an embodiment of a dispenser in accordance with the invention. Dispenser 10 includes a trough 8 having a concave interior shape sufficiently conforming with the exterior shape of a reservoir 2 mountably receivable thereon, to allow at least partial nesting of reservoir 2 therein while mounted, as shown for example in FIGS. 1a and 1b. As depicted in the Figures, the shape of trough 8 can be, for example, that of a hollow elongated cylinder, bisected along its longitudinal axis, matching the generally elongated cylindrical bottle shape of reservoir 2. Optionally, trough 8 can also be provided with a lowered top edge 8a at a terminal end thereof. This permits an animal to more easily access the interior of trough 8 during use, while the remaining top edge of trough 8, being of full height, discourages inadvertent spillage over the top, caused by back and forth rocking and the like.

A coupling assembly 1 provides a means for mounting reservoir 2 to dispenser 10, conveniently in a form which includes a threaded screw portion 5 threadingly engagable with a threaded top portion of reservoir 2. Coupling assembly 1 optionally includes a valve portion 4 to selectively prevent discharge of the contents within reservoir 2 by permitting positive closure of reservoir 2 from the outside. The threaded union between coupling assembly 1 and reservoir 2 is protected against leaks by a seal 6 (FIG. 2b) located at the base of threaded screw portion 5.

Means are provided for allowing relative movement of reservoir 2 and trough 8 between first and second mounted positions, shown respectively in FIGS. 1a and 1b, and FIGS. 2a and 2b. When in the first mounted position, reservoir 2 at least partially nests within the concave shaped surface of trough 8, thereby minimizing the overall volume of reservoir 2 and dispenser 10 for compact storage when not being used. When moved to the second mounted position, in which reservoir 2 locates clear of trough 8, the concave shaped surface of trough 8 oriented upward presents a pooling space for containing contents transferred thereto from reservoir 2. In the present embodiment, the above means for permitting relative movement while mounted are provided in the form of a pair of cylindrical shaft stubs or pivots 7a and 7b which protrude from nozzle assembly 1 perpendicular with a longitudinal axis of reservoir 2 and nozzle assembly 1. Trough 8 has a pair of holes 9a and 9b on opposed peripheral sides 11a and 11b thereof, for receiving therethrough cylindrical shaft stubs 7a and 7b. To simplify assembly, trough 8 is conveniently made of a suitable material which exhibits a moderate degree of resiliency, allowing opposed peripheral sides 11a and 11b to be spread apart sufficiently to allow cylindrical shaft stubs 7a and 7b to be inserted into, or removed from, holes 9a and 9b, as desired. Cylindrical shaft stubs 7a and 7b, normally retained within holes 9a and 9b, together define a pivot axis about which reservoir 2 and trough 8 can rotate with respect to one another. Optionally, trough 8 can be tapered at the location of opposed peripheral sides 11a and 11b to conform to the profile of threaded screw portion 5, simplifying the pivotal configuration of cylindrical shaft stubs 7a and 7b within holes 9a and 9b, assuring maximum compactness. Valve 4 is in a closed position when reservoir 2 is in this nested first mounted position, preventing any loss of the contents.

Figure 1A:
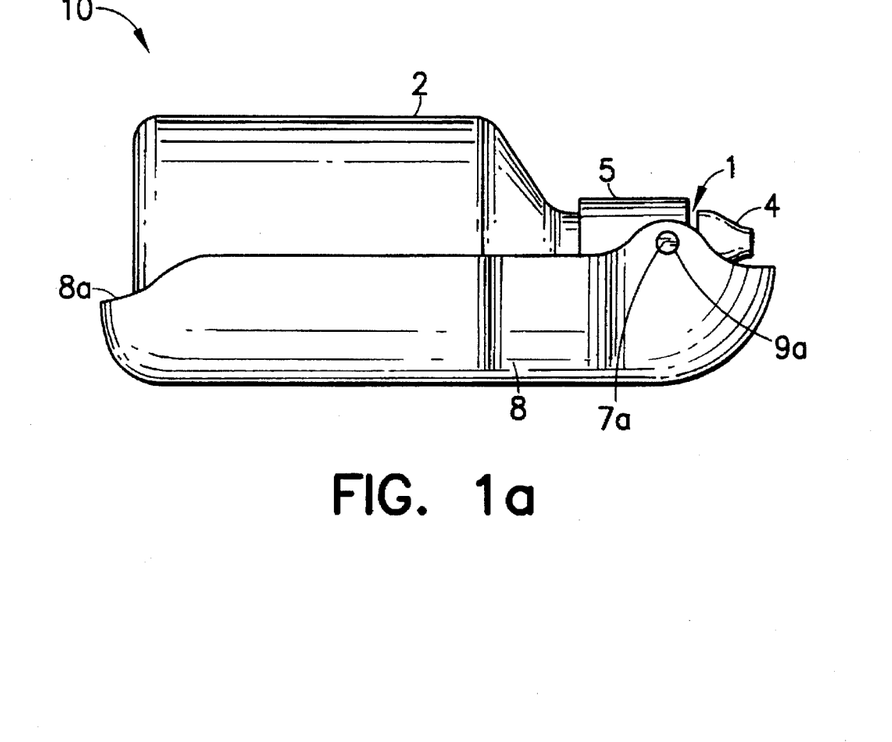
FIGS. 1a and 1b are respective side elevation and top plan views of a dispenser constructed in accordance with the invention, the reservoir being in a first mounted position thereof, wherein it is nested in the trough.
Figure 1B:
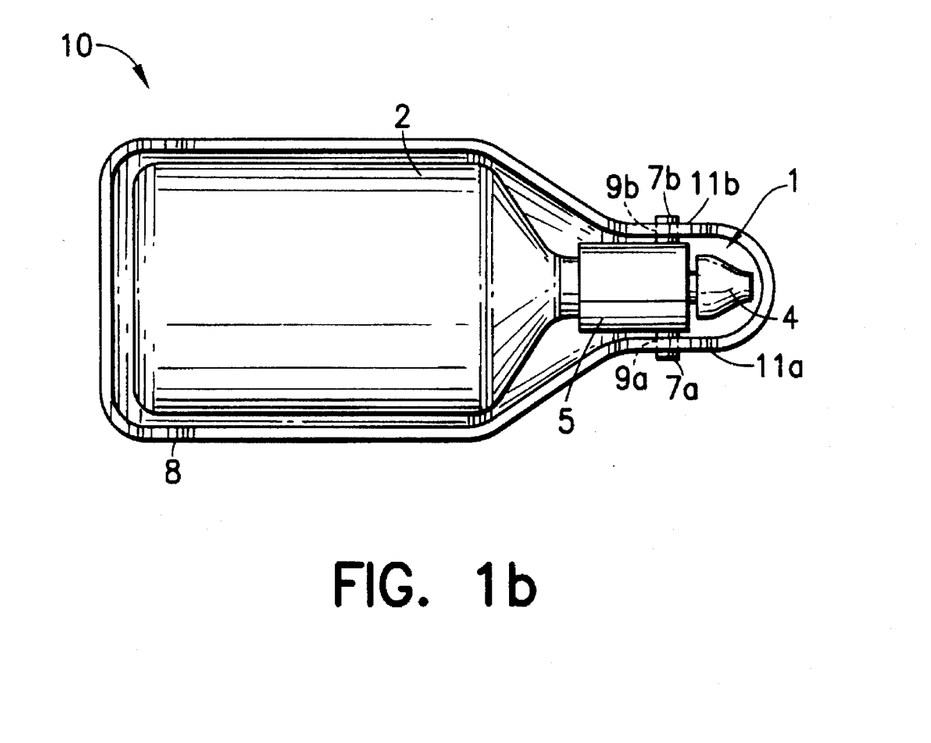
Figure 2A:
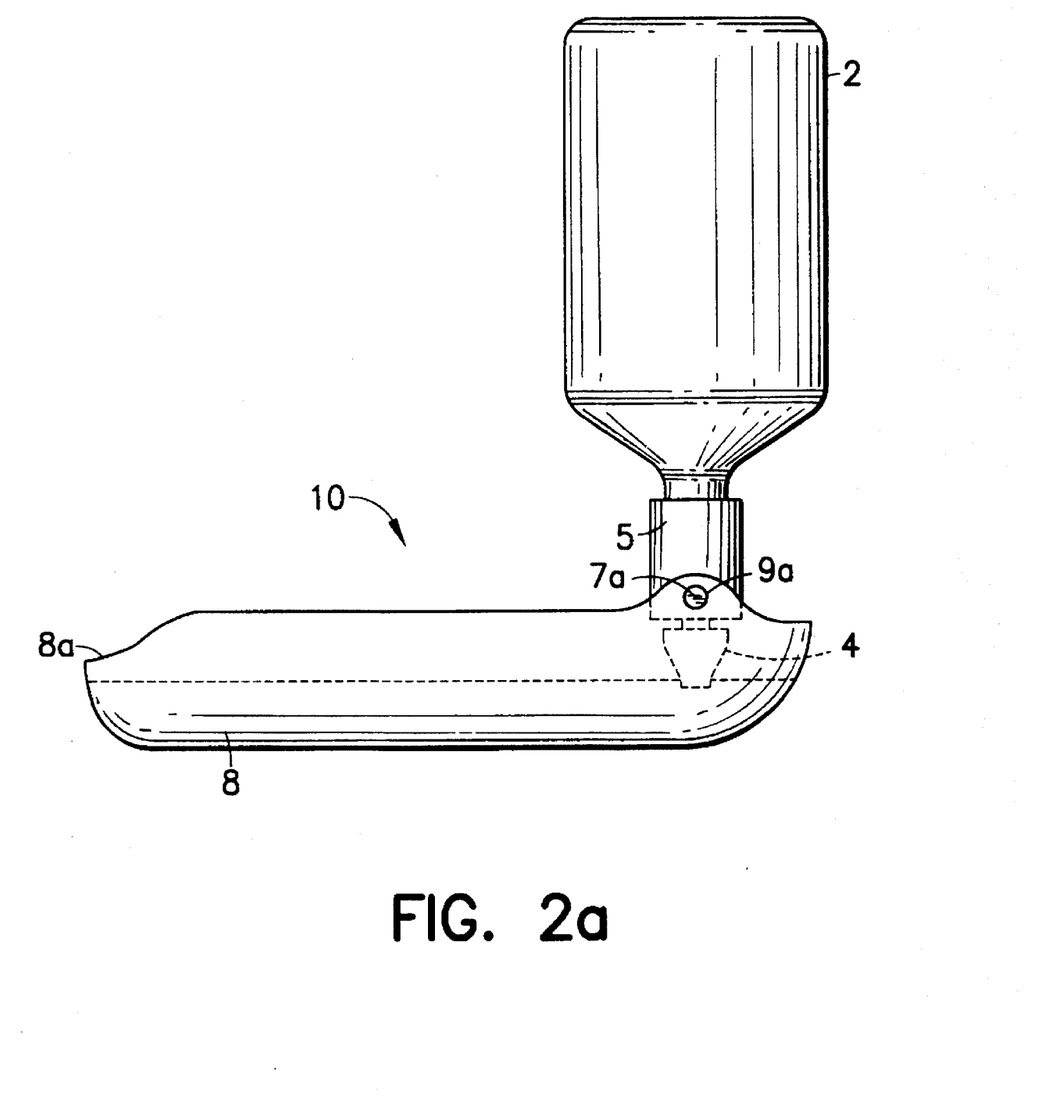
FIGS. 2a and 2b are respective side elevation and end views of the dispenser of FIGS. 1a and 1b, the reservoir being in a second mounted operational position thereof, wherein it is located clear of the trough.
Figure 2B:
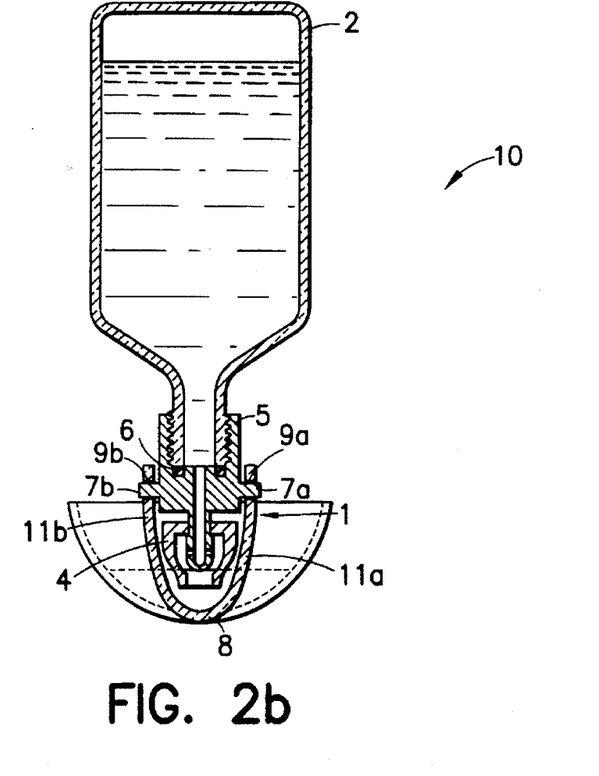

To use dispenser 10, trough 8 is oriented horizontally with its concave surface facing upward, with reservoir 2 nested therein. The bottom of reservoir 2 is hinged upward, pivoted about the axis of cylindrical shaft stubs 7a and 7b which rotate within holes 9a and 9b. Alternatively, reservoir 2 may be inverted while in nesting relationship with trough 8, and trough 8 hinged downward with respect to reservoir 2, to achieve the same result. In the preferred case, means are provided for permitting retention of a particular rotational orientation when swiveled between mounted positions. This is accomplished in the present embodiment by providing the inner surfaces of holes 9a and 9b and the outer surfaces of cylindrical shaft stubs 7a and 7b with parallel grooves aligned in the direction of the axis of rotation, allowing stepwise motion about the axis. When dispenser 10 and reservoir 2 are moved to the second mounted position, in which reservoir 2 is preferably in a substantially inverted, upright position, with trough 8 relatively horizontal, as shown in FIGS. 2a and 2b, valve 4 is opened, permitting a portion of the contents of reservoir 2 to flow therefrom and pool within the concave interior of trough 8. It is noted that by optionally constructing dispenser 10 such that the opening of valve 4 is oriented below the top edge at its lowest point of trough 8 when in opened in the second mounted position, as shown in the Figures, the atmospheric pressure exerted upon the pooled contents of trough 8 maintains the level within trough 8 to just above the discharge opening in valve 4, preventing overflow of the pooled contents from trough 8, while permitting replenishment as needed from reservoir 2, so long as valve 4 remains open. An animal may then consume a desired amount of the pooled contents from trough 8. To discontinue use, valve 4 is closed, and any remaining contents therein which has not been consumed, discarded. Trough 8 is then returned to its original first mounted position, in at least partial nesting relationship with reservoir 2.

Figure 3A:
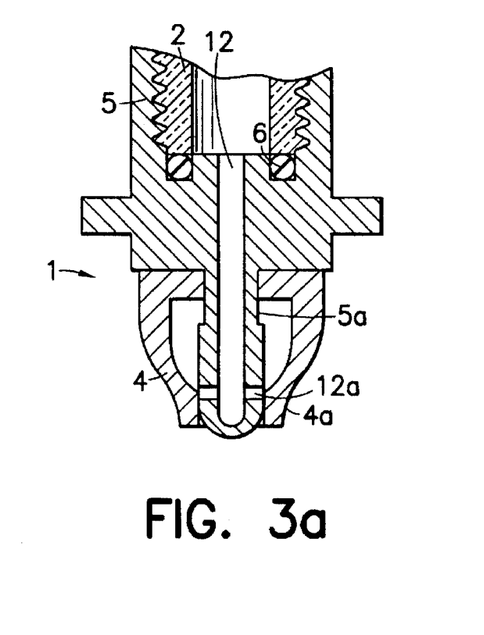
FIG. 3a is a cross-sectional detail of a typical valve configuration used in the dispenser of FIGS. 1a, 1b, 2a and 2b, the valve being in closed position.
Figure 3B:
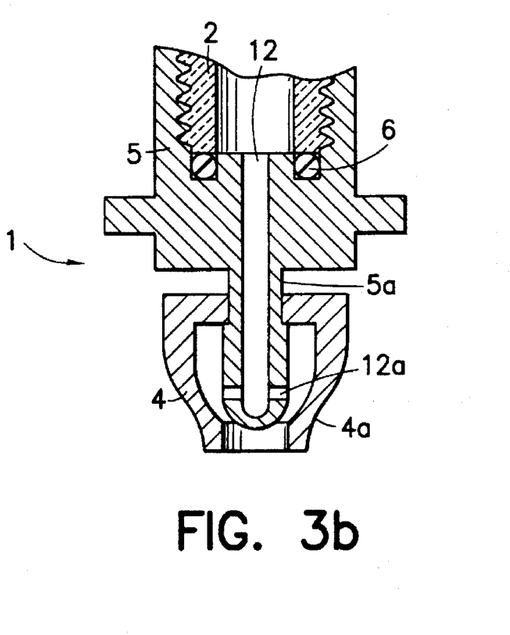
FIG. 3b is a cross-sectional detail of the valve of FIG. 3a, shown in open position.

FIGS. 3a and 3b are details of the structure of a typical configuration of valve 4, shown in closed and open positions, respectively. Threaded cap portion 5 includes in its structure an elongated shaft 5a with a central passage 12 formed therethrough, communicating with the an outlet of reservoir 2. Passage outlets 12a communicate with central passage 12, providing discharge openings for material passing from within reservoir 2 and into central passage 12. In the closed position, as shown in FIG. 3a, passage outlets 12a are blocked by a constricted nozzle portion 4a of valve 4, preventing flow of contents therefrom. When valve 4 is opened by sliding motion along elongated shaft 5a, as shown in FIG. 3b, passage outlets 12a are opened, permitting flow therethrough.

Turning now to FIGS. 4a, 4b, 4c, and 5, a further embodiment of the invention is depicted which includes automatic valve means responsive to movement between the various mounted positions, the dispenser generally designated 20. Dispenser 20 includes a nozzle coupling assembly 21, which includes means for sealingly mounting reservoir 2 thereto, in the form of a threaded cap portion 25 which threadingly receives cooperating threads carried on the neck portion atop reservoir 2. A seal 26 (shown in FIGS. 5 and 6) disposed within threaded cap portion 25 at the base of its internal threads prevents leakage between threaded cap portion 25 and reservoir 2.

Figures 4A, 4B:
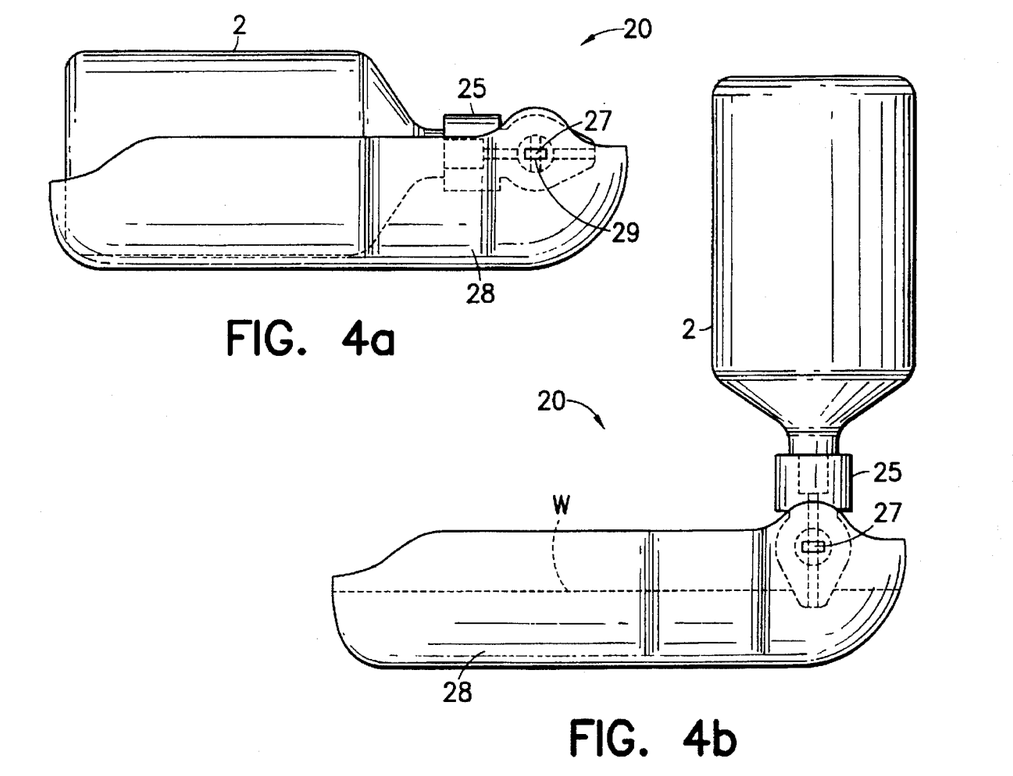
FIG. 4a is a side elevation of another embodiment of the invention with the reservoir in nested condition.
FIG. 4b is a side elevation of the dispenser of FIG. 4a shown in an operational position with the valve open.
Figure 4C:
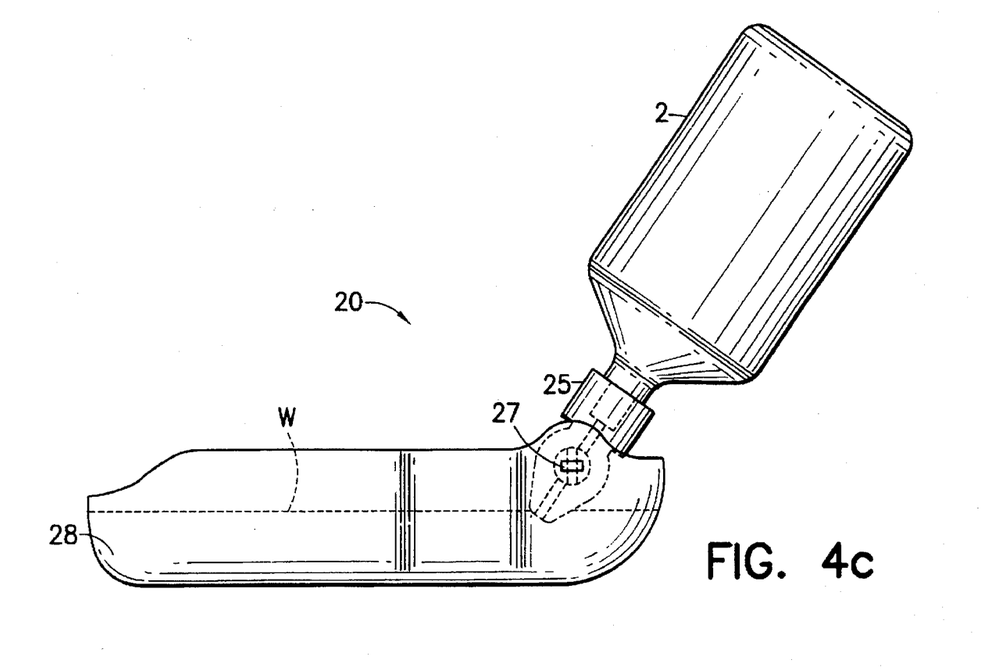
FIG. 4c is a side elevation of the dispenser of FIG. 4a and 4b shown in a further operational position with valve closed.

As with the previously described embodiment, means are provided for allowing relative movement of reservoir 2 and trough 28 between the various mounted positions illustrated in FIGS. 4a, 4b and 4c. It is noted that the positions depicted in FIGS. 4a and 4b are equivalent to the aforementioned first and second mounted positions, respectively. FIG. 4c is an optional third mounted position which may be included for further operating convenience since the present valve offers no manual means for closing the valve means when in the second mounted position, the significance of which will be described below in greater detail with regard to operation of the device. In the preferred embodiment, the means for allowing movement between mounted positions and the valve means responsive to the movement therebetween utilize common structural elements, thereby reducing greatly the complexity and production cost of dispenser 20. In the embodiment, a rotational stop cock valve 24 is positioned forward of threaded cap portion 25 in nozzle coupling assembly 21 to selectively permit and restrict flow therethrough. Stop-cock valve 24 comprises a valve body 24a and a cylindrical valve member 24b receivable in, and rotatable within, a valve seat 34 of cylindrical bore, disposed crosswise through valve body 24a. Cylindrical valve member 24b is preferably made from a resilient, self-sealing material, such as, for example, polytetrafluorethylene, commonly available, for example under the trade name TEFLON. An interference fit between cylindrical valve member 24b and valve seat 34 permits rotation of cylindrical valve member 24b within valve body 24a, while providing a watertight seal therebetween. Valve body 24a includes a bore 32a formed crosswise a cylindrical axis C of valve seat 34, valve body bore 32a communicating at respective ends thereof with the interior of reservoir 2 and a nozzle discharge outlet 33. Rotatable cylindrical valve member 24b also includes a bore 32b formed crosswise cylindrical axis C, which may be brought into communicative alignment with both ends of valve body bore 32a, by a respective rotational positioning thereof. A pair of flanges 27, protrude centrally from opposed ends of cylindrical valve member 24b along cylindrical axis C thereof, perpendicular with the longitudinal axis of reservoir 2. A trough 28 has a pair of rectangular holes 29 formed through opposed sides thereof, for captively receiving flanges 27 therethrough, preventing rotation of cylindrical valve member 24b with respect to trough 28. Although flanges 27 can be rectangular as shown in a preferred case, they may be alternatively of any cross-sectional geometry that would prevent rotation thereof with respect to trough 28, in which instance corresponding holes 29 would be of a matching receiving shape. As with trough 8 of the aforementioned embodiment, trough 28 is made of a like material which exhibits a moderate degree of resiliency, allowing the opposed sides of trough 28 to be spread apart sufficiently to allow flanges 27 to be inserted into, or removed from, rectangular holes 29, simplifying assembly or disassembly as desired. Flanges 27, captively retained within rectangular holes 29, hingably couple reservoir 2 to trough 28. This arrangement permits reservoir 2 to be connectively angled out of nesting relationship with trough 28 by rotation of valve body 24 about immobilized cylindrical valve member 24b, while simultaneous controlling valve operation in response to the relative positioning of reservoir 2 with respect to trough 28.

As with the previous embodiment, trough 28 has a concave surface sufficiently conforming with the exterior shape of reservoir 2 to allow at least partial conforming surface nesting therein of reservoir 2, thereby minimizing the overall dispenser envelope when the reservoir is oriented in this first mounted position. It is noted that the degree of conformity will be determined by design factors, balancing a need for compactness against adaptability of trough 28 to receive reservoirs of varying shape and dimension, such as will occur when dispenser 20 is used with prefilled, commercially available bottles for reservoir 2. It is further noted that the convex outside surface of trough 28 (and trough 8 in the previous embodiment), may present a shape different than that of the interior of trough 28, by variance for example of material thickness throughout. For example, the convex outer surface of trough 28 may be provided with a flattened central area, or raised peripheral regions, to better permit balancing of dispenser 20 when resting on a surface during use, or to discourage rolling thereof when nested.

FIG. 4a illustrates a side elevational view of dispenser 20, in which reservoir 2 is in a first mounted position, at least partially nested within trough 28. Optionally, trough 28 can be tapered at one end, presenting an inner width roughly matching the longitudinal dimensions of cylindrical valve member 24b for reception therebetween. While in this nested position, bores 32a and 32b are 90° out of alignment (shown dotted), preventing flow through stop-cock valve 24. The relative alignment of bores 32a and 32b in each of the various mounted positions will be described in greater detail below, with reference to FIGS. 7a, 7b and 7c, in which the positions of bores 32a and 32b are shown in cross-sectional detail, each figure corresponding respectively to the orientations shown in FIGS. 4a, 4b and 4c.

Figure 5:
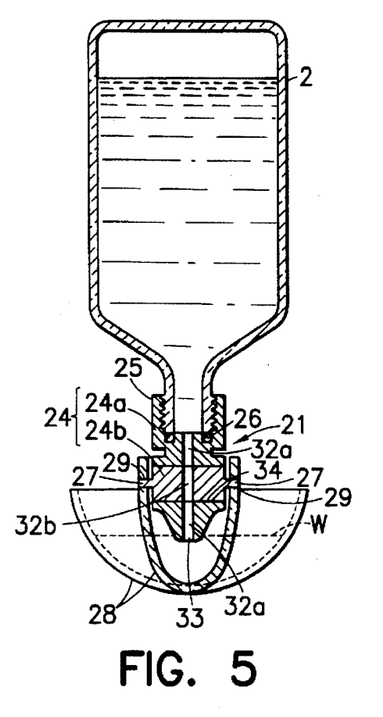
FIG. 5 is a cross-sectional end view of the dispenser in the operational position of FIG. 4b.
Figure 6:
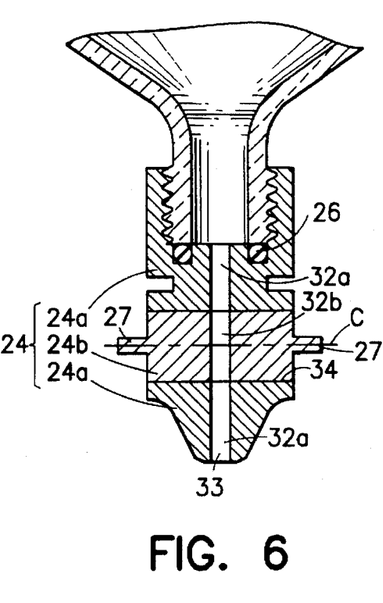
FIG. 6 is an enlarged cross-sectional end view detail of a nozzle coupling assembly employed in the valve depicted in FIG. 5.

Use of dispenser 20 is much the same as that described with regard to dispenser 10 in the previous embodiment, with an added advantage that flow of contents from reservoir 2 into trough 28 is automatically initiated and terminated by altering the relative mounted position of both. First, dispenser 20 with reservoir 2 mounted thereto and in the first mounted position is turned on its side, whereby trough 28 is oriented horizontally with its concave surface facing upward, and reservoir 2 is nested therein. The bottom of reservoir 2 is hinged upward with respect to trough 28, causing valve body 24a to rotate about cylindrical valve member 24b which is rotationally immobilized with respect to trough 28. Alternatively, reservoir 2 may be inverted while in nesting relationship with trough 28, and trough 28 hinged downward with respect to reservoir 2, to achieve the same result. Inner opposed surfaces of trough 28 at its tapered portion, and lateral sides of valve body 24a adjacent valve seat 34, are preferably provided with a plurality of radially formed grooves (not shown), which radiate from a common origin being the common cylindrical axis C of valve member 24b and valve seat 34, allowing stepwise rotation about the axis C, while permitting retention of a particular rotational orientation. When reservoir 2 is moved into a second mounted position preferably in which it in a substantially upright position and trough 28 is substantially horizontal, as shown in FIG. 4b and FIG. 5 in end view, bores 32a and 32b are brought into communicative alignment, as shown in greater detail in FIG. 7b, thereby allowing flow through nozzle coupling assembly 21, into the pooling space of trough 28. In the present embodiment, the outlet of reservoir 2 is in pool feeding communication with trough as a consequence of a positioning of nozzle outlet 33 directly over trough 28, as shown in FIG. 4b. It is understood, however, that other embodiments may provide other means for directing flow from the outlet of reservoir 2 into trough 28, wothout this vertical alignment, such as for example connection via a flexible tube or like conduit, as discussed later.

By orienting reservoir 2 vertically, gravitational contents emptying force is exerted on the contents, which is expelled through nozzle coupling 21, to pool in the trough 28. Dispenser 10 is configured such that nozzle discharge outlet 33 is oriented below the top edge of trough 28 when in the second mounted position. Consequently, atmospheric pressure exerted downwardly upon the exposed surface of the pooled contents of trough 28 maintains a level W within trough 28 (shown as dotted lines in FIGS. 4b, 4c, and 5) at just above nozzle discharge outlet 33 in nozzle coupling 21, preventing overflow from trough 28, while permitting replenishment during consumption from reservoir 2. An animal may then consume a desired amount of the pooled contents from trough 8.

Figures 7A, 7B:
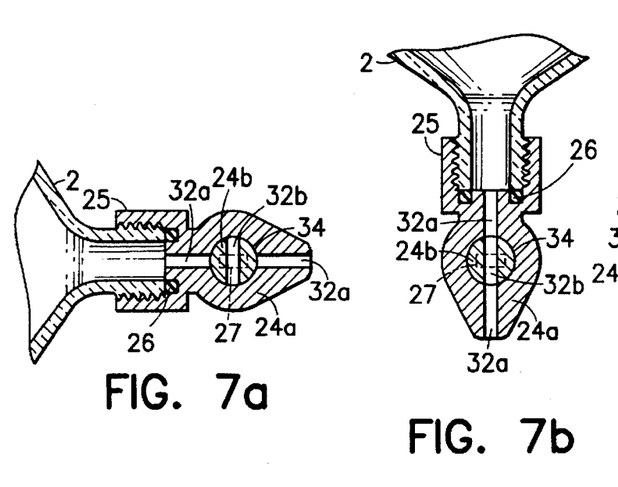
Figure 7C:
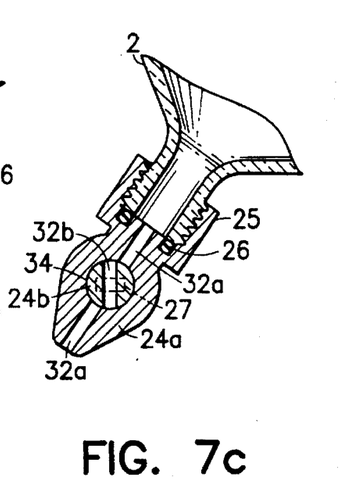
FIG. 7c is a longitudinal cross-sectional detail of the nozzle coupling assembly showing relative alignment of the bores as oriented in FIG. 4c.

An optional feature of the present embodiment permits movement of reservoir 2 to a third mounted position past the second mounted position to facilitate return of the device to the first mounted position following use, without unwanted spillage of contents. In order to discontinue use of dispenser 20 utilizing of this feature, reservoir 2 is rotated further, to the third mounted position the position illustrated in FIG. 4c. In this position, bores 32a and 32b are no longer in communicative alignment, terminating flow through nozzle coupling 21, as seen most readily in FIG. 7c. This third position permits a return of reservoir 2 to a nested position within trough 28, without danger of additional contents flow during the closure operation. To close dispenser 20, any remaining contents therein which has not been consumed is discarded. Reservoir 2 is then inverted to an upright position, with nozzle coupling 21 oriented in an uppermost position, and without altering the relative positioning of reservoir 2 with respect to trough 28. Trough 28 is then hinged downward to enshroud reservoir 2, with stop-cock valve 24 in a closed position, preventing contents leakage from nozzle coupling 21, as shown in FIG. 7a.

During use, the dispenser as previously described in the aforementioned embodiments my be hand held, and presented to an animal for consumption of its pooled contents. In this case, the reservoir may typically be he hand, and the trough extending outwardly below maintained at an acceptable height from the ground to suit the needs of the particular dog or animal being fed or watered. However, it may be desirable to rest the dispenser on the ground or other solid support surface to allow the animal free access to the dispensed liquid or the like over a period of time. In such case, a flat region on the convex exterior of the trough or raised peripheral regions thereon, as has been previously suggested, will provide some stability. However, additional means for stabilizing and maintaining the dispenser in a balanced state, with the reservoir in an inverted, upright orientation, may be desired.

Figure 8A:
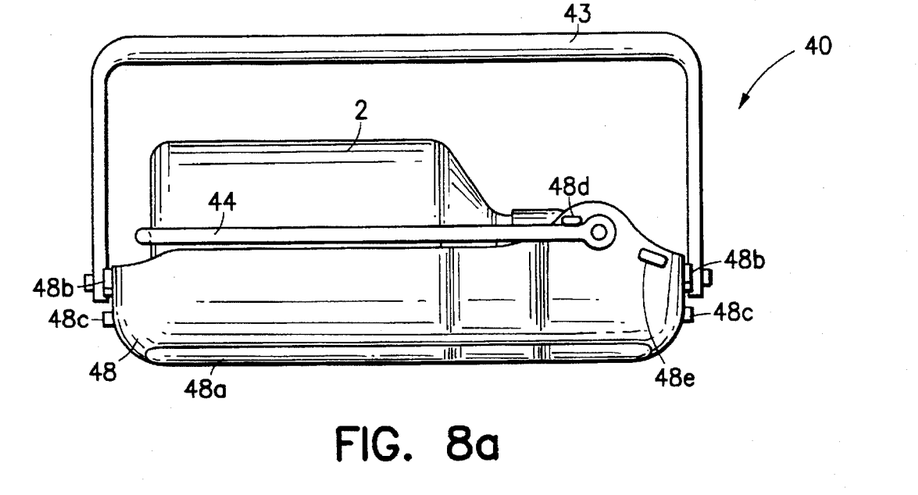
FIG. 8a is a side elevation of an embodiment of a dispenser embodying carrying and stabilizing support means, the dispenser being shown in nested condition.
Figure 8B:
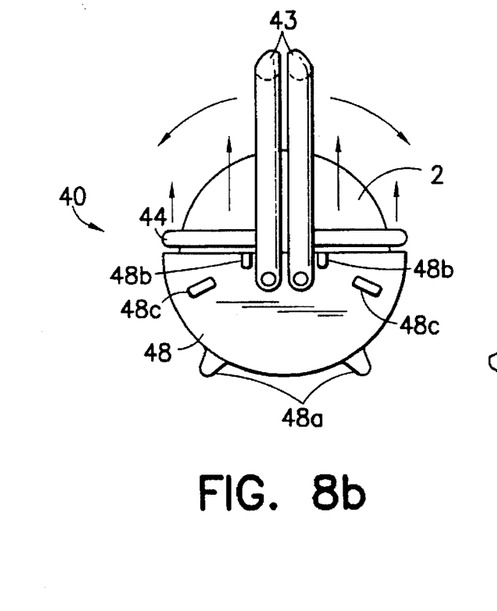
FIG. 8b is an end view of the dispenser of FIG. 8a shown in nested condition.
Figure 9A:
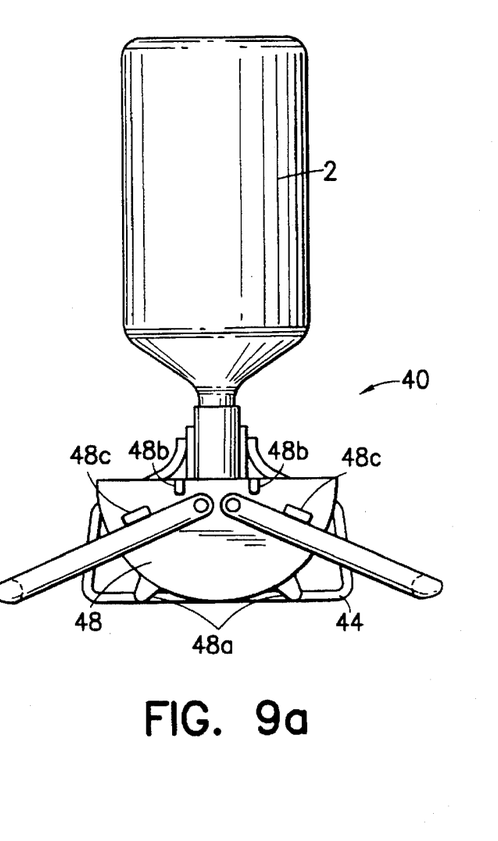
FIG. 9a is an end view of the dispenser of FIG. 8a and 8b with the carrying and stablizing support means, the dispenser shown in operational condition.
Figure 9B:
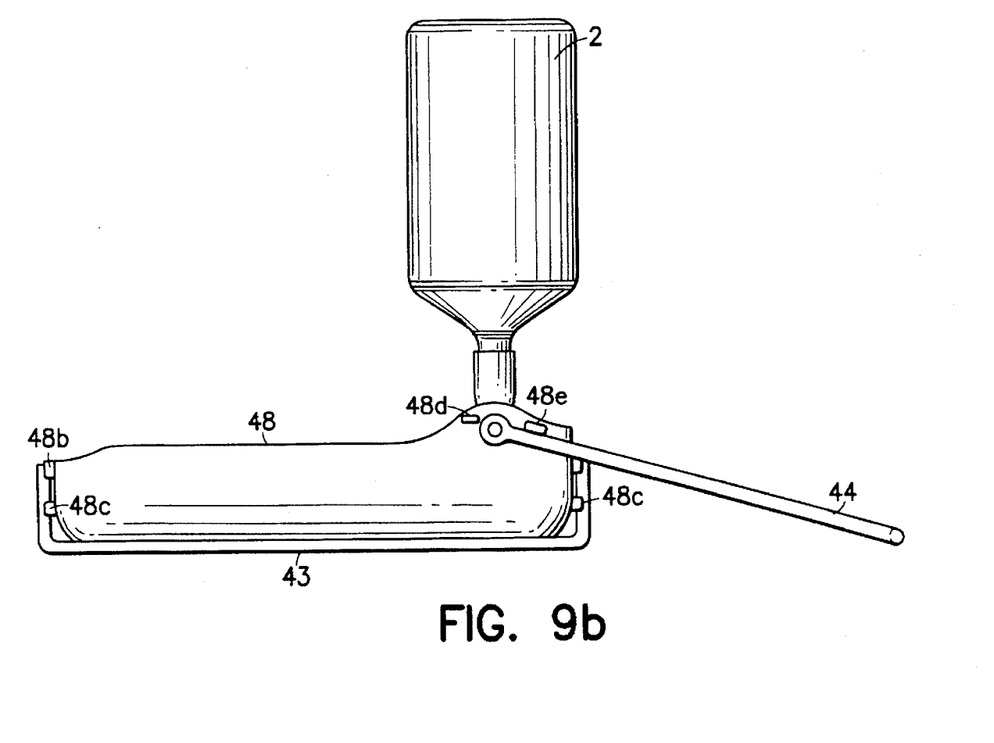
FIG. 9b is an side elevation of the dispenser of FIG. 9a shown in operational condition.
Figure 9C:
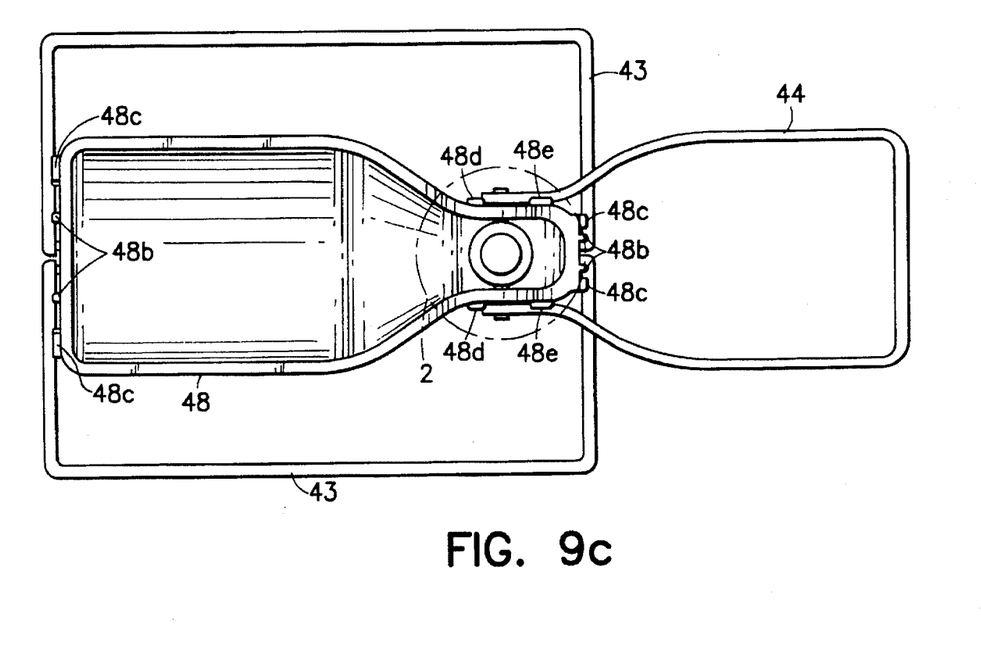
FIG. 9c is a top plan view of the dispenser of FIGS. 9a and 9b shown in operational condition, with the reservoir shown in phantom.

Referring now to FIGS. 8a, 8b, and 9a–9c, another embodiment according to the invention is depicted which includes stabilization means for providing independent support when placed on the ground or other secure support surface, the dispenser generally designated 40. The structural modifications described with reference to the present embodiment does not affect functional performance of a dispenser on which they are included, and may, for example, be used with equal effectiveness on either of the aforementioned embodiments. Referring in particular to FIGS. 8a and 8b, reservoir 2 is shown in mounted engagement with dispenser 40, pivotally connected to a trough 48 through nozzle coupling assembly 21. A pair of bilateral support members 43 are swivelably mounted to trough 48 at opposed ends thereof. Bilateral support members 43 are oriented in a folded position, proximate one another, when dispenser 40 is in an at least partially nested first mounted position, as shown in FIGS. 8a and 8b. This orientation occupies a minimum of space, and assists in transportation of dispenser 40 when reservoir 2 is mounted thereto, by providing a carrying handle. A pair of raised peripheral regions 48a which run substantially the length of trough 48 may be optionally provided, as already discussed, to discourage rolling of dispenser 40 when placed on a support surface. Means are provided for maintaining the folded position, for example by providing tabs 48b on trough 48 which protrude from the surface thereof and which interfere with movement of bilateral support members 43 from the folded position. By constructing bilateral support members 43 from resilient material, the resistance of tabs 48b can be overcome by applying adequate force to spread bilateral support members 43 sufficiently apart to clear tabs 48b, and allow pivotal movement thereof from the folded position shown in FIGS. 8a and 8b to a supporting position as shown in FIGS. 9a, 9b and 9c. Bilateral support members 43 are similarly maintained in the supporting position by equivalently configured tabs 48c. An additional support member 44 pivotably mounted, for example, on trough 48 proximate its point of mounting to nozzle coupling assembly 21, may also be provided to enhance longitudinal stability. Tabs 48d and 48e, best seen in FIGS. 8a and 9b, retain folded and supporting positions, respectively, in a manner as described above with regard to bilateral support members 43. It is noted that reservoir 2 is shown in phantom by broken lines in FIG. 9c to allow an unobstructed top view of the structure of dispenser 40.

It is noted that any number of other equivalent structural configurations which provide stabilization means are possible without departure from the intended scope of the invention as disclosed and claimed herein. For example, the stabilization means need not be pivotably mounted to the dispenser, but rather may be mounted to permit slidable movement between folded and supporting positions. Furthermore, means for maintaining either of these positions may be accomplished in a manner other than employing protruding locking tabs as in the aforementioned embodiment.

Figure 10A:
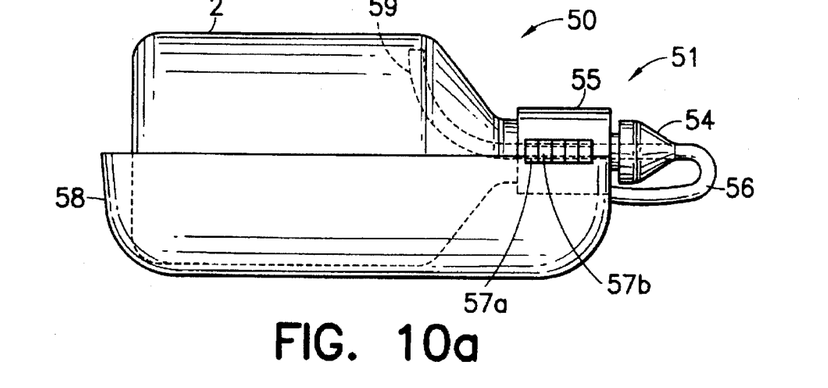
FIG. 10a is a side elevation of a further embodiment of a dispenser in accordance with the invention, shown in nested position.
Figure 10B:
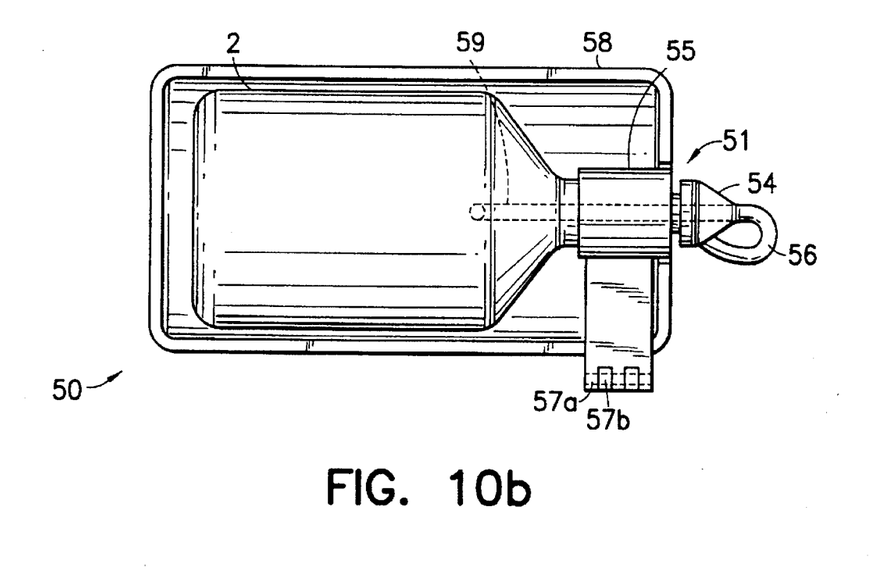
Figure 10C:
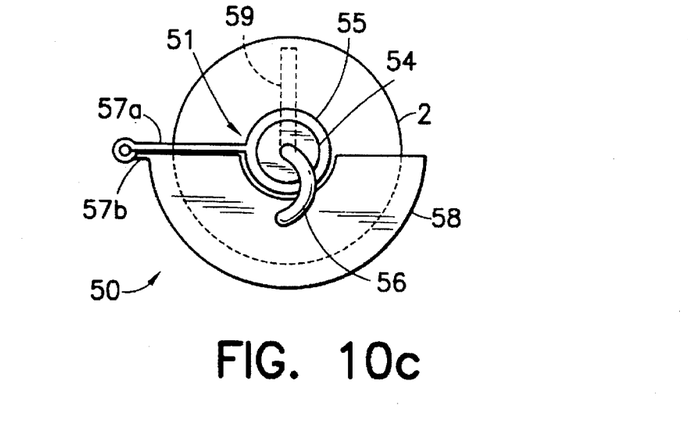
FIG. 10c is an end view of the dispenser of FIGS. 10a and 10b.
Figure 11A:
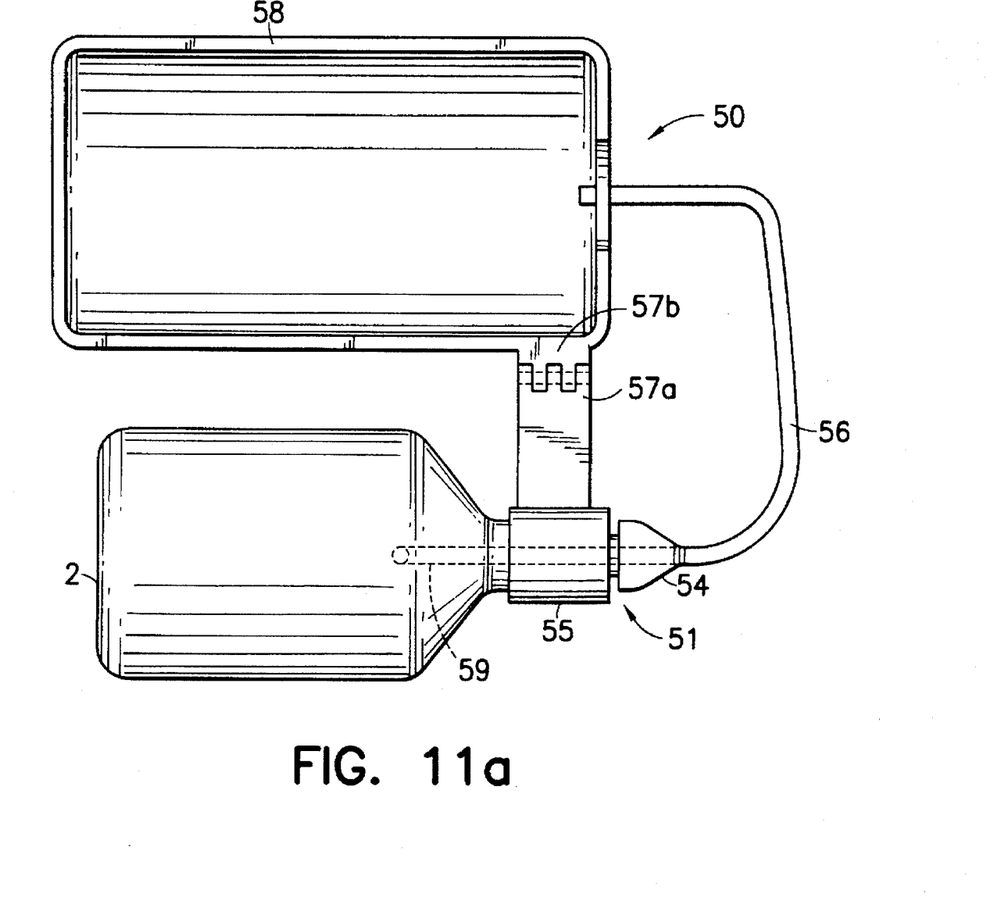
FIG. 11a is a top view of the dispenser of FIG. 10a–10c shown in operational condition.
Figure 11B:
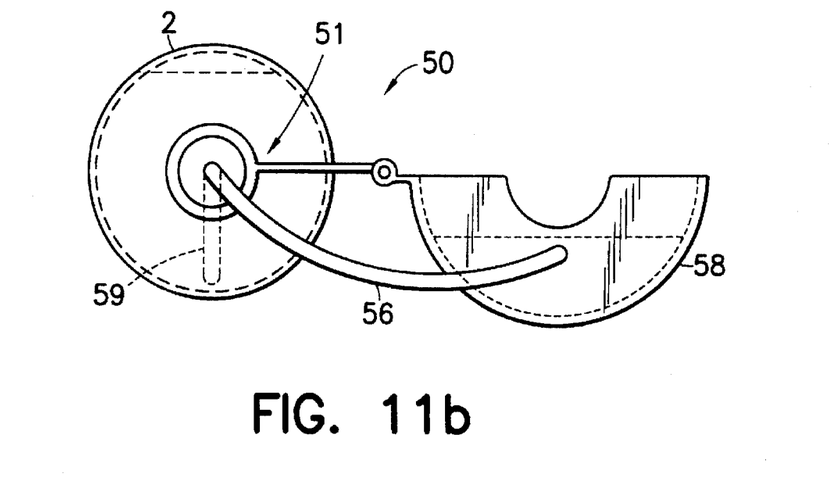
FIG. 11b is an end view of the dispenser of FIG. 10a–10c shown in operational condition.

Turning now to FIGS. 10a–10c, 11a and 11b, a further embodiment of the dispenser according to the invention is shown, generally designated 50. Dispenser 50 includes a trough 58 movably mountable to a reservoir 2, receivable in a first mounted position, at least partially nested within trough 58 as shown in FIGS. 10a–10c. When moved to a second mounted position, as shown in FIGS. 11a and 11b, reservoir 2 is cleared from trough 58, making accessible a pooling space defined by its upwardly oriented concave interior to an animal wishing to consume contents transferred thereto from reservoir 2. Dispenser 50 further includes means for mounting reservoir 2 to dispenser 10, in the form of a coupling assembly 51 which conveniently includes a threaded screw portion 55 threadingly engagable with threads carried atop reservoir 2. Coupling assembly 51 optionally includes a valve 54 to selectively prevent discharge of the contents within reservoir 2, functioning in a manner equivalent to valve 4 in a prior described embodiment. It is noted that although a manual valve has been selected for purposes of disclosure relating to this particular embodiment, another embodiment employing the laterally hingable configuration set forth herein may include a form of automatically actuated valve means responsive to change in relative positioning of trough 58 and reservoir 2.

Coupling assembly 51 is mounted for hinged movement to trough 58, thereby permitting movement between first and second mounted positions. Cooperating hinge elements 57a and 57b are laterally carried on each of coupling assembly 51 and trough 58, respectively. It is noted that hinge element 57b is carried on threaded screw portion 55 of coupling assembly 51 for purposes of structural simplicity, and could alternatively be located elsewhere along the length of reservoir 2. For example, dispenser 50 could include a circumferencial sleeve harness adapted to receive and grip reservoir 2, hinge element 57a being carried on the harness, and cooperating hinge element 57b on trough 58.

A pool feeding tube 56 connects an outlet of valve 54 to the interior of trough 58 through an end thereof. Since the outlet of reservoir 2 is not structurally positioned above the pooling space formed by the interior shape of trough 58, as in the previously described embodiments, pool feeding tube 56 provides an alternate means for directing an induced flow of the contents from reservoir 2 into the pooling space when in the second mounted position. Pool feeding tube 56 is made of flexible plastic, or a material with like characteristics, to permit dispenser 50 to be pivoted between first and second mounted positions without interference.

In this embodiment, the force of gravity acting on the contents of reservoir 2 will be sufficient to only partially empty the contents in reservoir 2, since reservoir 2 is horizontally rather than vertically disposed when in the second mounted position. In this regard, where reservoir 2 is comprised of a resilient material, flow may be induced simply by squeezing reservoir 2. Other, more elaborate means for supplying the necessary contents emptying force may be devised where use of a reservoir 2 made of rigid material in desired.

A siphon tube 59, connected to an inlet of valve 54, is constructed of a relatively rigid material providing the characteristic of shape retention. Siphon tube 59 is curved, and of appropriate length, to extend substantially to the inside circumferencial wall of reservoir 2, oriented downwardly within horizontally disposed reservoir 2 when in the second mounted position clear of trough 58. This arrangement permits flow of contents from reservoir 2 into trough 58 when acted upon by a contents emptying force, induced for example by squeezing reservoir 2, even when the contents of reservoir 2 falls to a level below the inlet of valve 54.

Operation of dispenser 50 is as follows. Reservoir 2 containing water or other flowable feed material is attached to dispenser 50 by inserting the curved siphon tube 59 into the outlet of reservoir 2, and screwing reservoir 2 into threaded screw portion 55 of coupling assembly 51. During transportation and when not actively in use, dispenser 50 is oriented in the first mounted position with reservoir 2 at least partially nested within trough 58. Valve 54 is in a closed position to prevent inadvertent loss of contents from reservoir 2. During use, reservoir 2 is hinged laterally out of nesting relationship with trough 58 and brought to the second mounted position in which reservoir 2 and trough 58 are positioned side by side, the longitudinal axis of each approximately parallel with one another. In this position, as best seen in FIG. 11b, the outer peripheral walls of both reservoir 2 and trough 58, oriented downward, are aligned along a common plane, permitting dispenser 50 to be stably supported when placed on the ground or other level secure surface. Because reservoir does not extend longitudinally upward when in the second mounted position as in the previously described embodiments, no additional stabilization means are generally required for the present embodiment. Valve 54 is then opened, and reservoir 2 squeezed to allow a desired volume of contents to flow from reservoir 2, through pool feeding tube 56, into the pooling space defined by the concave interior of trough 58. As noted above, initial flow of contents from reservoir 2 may be gravity induced, by will later reqirure application of an additional contents emptying force when the contents of reservoir 2 is depleted below a certain level. When feeding is complete, valve 54 is closed, any unconsumed contents remaining in trough 58 discarded, and reservoir 2 returned to the first mounted position by pivoting reservoir 2 laterally for at least partial reception within the interior of trough 58.

It is noted that each of the above described embodiments are designed for reception of the same reservoir having an elongated, roughly cylindrical shape. This is particularly well suited for dogs or other animals having elongated snouts. It will be understood, however, that the dispenser according to the present invention may alternatively be adapted to receive a reservoir having a diameter greater than its length, or any other shaped reservoir suited to the particular need of the particular animal for which it is designed, in at least partial nesting relationship within the trough of the dispenser.

It is further noted, that although each of the aforementioned embodiments utilize a hinge structure to accomplish mounted movement between first and second mounted positions, by permitting the reservoir to pivot in and out of its nesting relationship within the trough, other means for movably mounting the reservoir on the trough may be employed without departure from the contemplated scope of the invention as claimed. For example, a dispenser in accordance with the invention may be designed which permits a reservoir to be slidably mounted on the trough, the slide mechanism so employed permitting mounted movement between the nested, first mounted position, and the second mounted position, in which the reservoir is clear of the trough. In addition, means providing alternate mounted movement may include any one, or a combination of, hingable, slidable and other relative motion to accomplish suitable relative positioning of the reservoir and trough.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for feeding animals from a feed material containing reservoir, said device comprising:

an open top trough structure providing a pooling space in which feed material can pool; and means for mounting the reservoir on said trough so that it can be mountably moved, while remaining attached to the trough, from a first mounted position thereof wherein it is at least partially nested in said trough pooling space, to at least another mounted position wherein the reservoir is located sufficiently clear of said trough pooling space, so that if a transfer of feed material from the reservoir to the pooling space be effected to pool feed material in the trough, an animal has feeding access to pooled feed material in the trough.

2. The device according to claim 1, wherein:

said at least another mounted position includes a second mounted position; and said device further comprises means for directing said transfer of said contents from said reservoir into said pooling space when in said second mounted position.

3. The device according to claim 2, wherein:

said means for directing includes an outlet from said reservoir being disposed above said pooling space.

4. The device according to claim 2, wherein:

said means for directing includes a pool feeding tube communicating with an outlet from said reservoir and said trough pooling space.

5. The device according to claim 1, further comprising:

valve means for selectively permitting and terminating a flow of said contents from said reservoir to respectively effect and prevent said transfer.

6. The device according to claim 5, wherein:

said at least another mounted position includes a second mounted position; and said device further includes means responsive to movement between said first and said at least another mounted position for opening and closing said valve means depending upon a particular reservoir mounted position, said means responsive to movement correspondingly closing said valve means and terminating said flow when in said first mounted position, and opening said valve means and permitting said flow when in said second mounted position.

7. The device according to claim 6, wherein:

said at least another mounted position further includes a third mounted position; and said means responsive to movement closing said valve means and terminating said flow in response to movement of the reservoir to said third mounted position.

8. The device according to claim 5, wherein:

said valve means and said means for mounting include a stop-cock valve.

9. The device according to claim 8, wherein:

said stop cock comprises a valve body including structure defining a cylindrical bore, and a cylindrical valve member rotatably receivable in said cylindrical bore;

said means for mounting includes means for attachably receiving the reservoir whereby said means for attachably receiving is carried on said valve body;

said valve body mounting includes structure defining a valve bore therethrough disposed crosswise, and intersecting with, said cylindrical bore, a first end of said valve bore being in communication with a contents of the reservoir when same is received on said means for attachably receiving, a second end of said valve bore providing a valve outlet;

said cylindrical valve member includes structure defining a cross-wise bore which may be brought into and out of communicative alignment with said valve bore by relative rotation therebetween, said cylindrical valve member being longitudinally disposed crosswise said trough and non-rotatable with respect thereto; and said valve bore and said cross-wise bore being oriented such that said stop cock valve is in a closed position when the reservoir is in said first position preventing flow therethrough, said valve body bore and said cross-wise bore being brought into communicative alignment when said reservoir is in said second mounted position, whereby contents from said reservoir is permitted to flow through said stop cock valve and out of said valve outlet into said pooling space.

10. The device according to claim 9, wherein:

said trough includes structure deflating receiving holes in opposed sides thereof;

said cylindrical valve member including flanges carried at opposed ends thereof, said flanges being receivable in said receiving holes, said flanges and said receiving holes being of a shape preventing rotation of said cylindrical valve member with respect to said trough.

11. The device according to claim 1, further comprising:

stabilization means for providing upright support when said device is placed on a surface with said trough in contact therewith.

12. The device according to claim 11, wherein:

said stabilization means include raised regions disposed peripherally on said trough.

13. The device according to claim 11, wherein:

said stabilization means include a pair of bilateral support members, pivotably mounted to said trough at opposed ends thereof and movable between a folded position and an unfolded position;

at least portion of each of said pair of bilateral support members being outwardly disposed of said trough and in contact with said support surface when in said unfolded position thereby providing lateral support for said device; and said pair of bilateral support members forming a carrying handle when brought together in proximate relation to one another in said folded position.

14. The device according to claim 1, wherein:

said means for mounting includes means for permitting pivotable movement between the reservoir and said trough.

15. A device for feeding animals from a feed material containing reservoir, said device comprising:

an open top trough structure providing a pooling space in which feed material can pool;

means for mounting the reservoir on the trough so that it can be moved from a first mounted position thereof wherein it is at least partially nested in said trough pooling space to at least another mounted position wherein said reservoir is located clear of said trough pooling space so that if a transfer of feed material from said reservoir to the pooling space be effected to pool feed material in the trough, an animal has feeding acccess to pooled feed material in the trough; and valve means for selectively permitting and terminating a flow of said contents from said reservoir.

16. The device according to claim 15, wherein:

said at least another mounted position includes a second mounted position; and said valve means include means responsive to movement between said first and said another mounted positions for correspondingly terminating said flow when in said first mounted position, and permitting said flow when in said second mounted position.

17. The device according to claim 16, wherein:

said valve means and said means for mounting include a stop-cock valve.

18. A device for feeding animals from a feed material containing reservoir, said device comprising:

a trough having an interior surface defining a pooling space;

means for movably mounting the reservoir to said trough, said means for mounting including means for allowing movement between first and second mounted positions, the reservoir and said trough remaining attached during said movement;

said interior surface suitably shaped for receiving said reservoir in at least partial nesting relationship therewith when in said first mounted position;

said reservoir being clear of said trough when said device is oriented in said second mounted position; and means for directing an induced flow of said contents from said reservoir into said pooling space when in said second mounted position.

19. The device according to claim 18, wherein:

said means for directing an induced flow of said contents from said reservoir includes positioning an opening from said reservoir in vertical alignment with said pooling space.

20. The device according to claim 19, wherein:

said opening from said reservoir is disposed below a minimum height of top peripheral edge of said trough when in said second mounted position.

* * * * *